(12) United States Patent
Perkins et al.

(10) Patent No.: US 8,692,704 B1
(45) Date of Patent: Apr. 8, 2014

(54) REGISTERING COHERENT CHANGE DETECTION PRODUCTS ASSOCIATED WITH LARGE IMAGE SETS AND LONG CAPTURE INTERVALS

(75) Inventors: David Nikolaus Perkins, Albuquerque, NM (US); Antonio I. Gonzales, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 343 days.

(21) Appl. No.: 13/242,569

(22) Filed: Sep. 23, 2011

(51) Int. Cl.
*G01S 13/00* (2006.01)

(52) U.S. Cl.
USPC ........ 342/25 A; 342/25 R; 342/25 F; 342/191

(58) Field of Classification Search
CPC ....................................... G01S 13/90
USPC ...................... 342/25 R–25 F, 191
See application file for complete search history.

(56) References Cited

U.S. PATENT DOCUMENTS

| | | | | |
|---|---|---|---|---|
| 6,466,156 B1* | 10/2002 | Ulander | ...................... | 342/25 R |
| 8,138,960 B2* | 3/2012 | Nonaka et al. | ............... | 342/25 A |
| 2010/0007549 A1* | 1/2010 | Smith | .......................... | 342/25 A |
| 2010/0045513 A1* | 2/2010 | Pett et al. | .......................... | 342/25 |
| 2011/0299733 A1* | 12/2011 | Jahangir et al. | ............... | 382/103 |

\* cited by examiner

*Primary Examiner* — John B Sotomayor
*Assistant Examiner* — Marcus Windrich
(74) *Attorney, Agent, or Firm* — Michael A. Beckett

(57) ABSTRACT

A set of co-registered coherent change detection (CCD) products is produced from a set of temporally separated synthetic aperture radar (SAR) images of a target scene. A plurality of transformations are determined, which transformations are respectively for transforming a plurality of the SAR images to a predetermined image coordinate system. The transformations are used to create, from a set of CCD products produced from the set of SAR images, a corresponding set of co-registered CCD products.

12 Claims, 3 Drawing Sheets

US 8,692,704 B1

REGISTERING COHERENT CHANGE DETECTION PRODUCTS ASSOCIATED WITH LARGE IMAGE SETS AND LONG CAPTURE INTERVALS

This invention was developed under Contract DE-AC04-94AL85000 between Sandia Corporation and the U.S. Department of Energy. The U.S. Government has certain rights in this invention.

FIELD

The present work relates generally to imaging with synthetic aperture radar (SAR) and, more particularly, to co-registration of coherent change detection (CCD) products.

BACKGROUND

Coherent change detection (CCD) offers the capability for detecting changes that occur in a target scene between SAR imaging passes. A sequence of SAR imaging passes produces a sequence of complex SAR images that respectively correspond to the imaging passes. The CCD process produces a set of CCD products, each of which represents a comparison of a pair of SAR images of the target scene that have been captured during time-wise adjacent airborne imaging passes. The creation of each CCD product involves a sub-pixel co-registration of the associated pair of SAR images. The set of CCD products is then registered to a common coordinate system, resulting in a set of co-registered CCD products for use in producing statistical models about the target scene, on a pixel-by-pixel basis. Traditionally, however, for a large set of SAR images taken across a long span of time, it has been difficult to produce a co-registered set of CCD products with sufficient accuracy to permit collection of useful statistics.

In particular, extending the aforementioned pair-wise, sub-pixel co-registration approach across many images presents some problems. First, every time an image is transformed a small amount of error is introduced. Second, creating a good CCD product requires very accurate sub-pixel registration. Accurate sub-pixel registration cannot be achieved with complex SAR images that are significantly separated in time, which leads to poor quality CCD products. These problems make it difficult to use simple solutions such as registering all of the CCD products to a common coordinate system.

It is desirable in view of the foregoing to provide for producing a set of co-registered CCD products that is suitable for statistical analysis and avoids problems such as those associated with longer image sequences and increased time between image passes.

DETAILED DESCRIPTION

Example embodiments of the present work provide for co-registering a large set of SAR CCD products that span a significant amount of time. The present work exploits the fact that conventional techniques for producing a CCD product from a pair of complex SAR images use extremely accurate sub-pixel registration between the pair of complex SAR images. According to example embodiments of the present work, transformations produced by co-registration of the complex SAR images are used to co-register the corresponding CCD products. Some embodiments maintain the best image registration possible for CCD products while reducing the number of image transformations, producing high quality CCD products with minimal error introduction.

Figure 1:
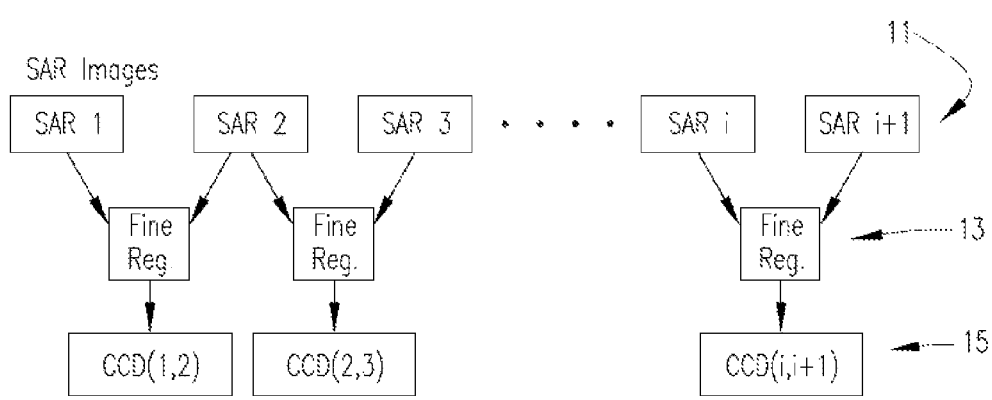
FIG. 1 diagrammatically illustrates conventional use of sub-pixel registration techniques to produce a set of CCD products from a set of SAR images.

Example embodiments of the present work create a co-registered set of CCD products corresponding to a time interval of SAR image capture by first producing a set is of time-ordered CCD products according to a conventional technique. In particular, the raw complex SAR images are ordered with respect to the time they were taken, and indexed as SAR i, for i=1, 2, ..., as shown at 11 in FIG. 1. The SAR images shown at 11 are captured sequentially during an image capture interval. Starting with the second image in the sequence, SAR 2, each image is sub-pixel registered to the immediately preceding image, as shown at 13 in FIG. 1, to create a corresponding CCD product designated by CCD(i, i+1), as shown at 15 in FIG. 1. The aforementioned sub-pixel registration is also designated herein as fine registration. Techniques for capturing a sequence of SAR images are known in the art, as are techniques for performing sub-pixel registration between sequentially adjacent pairs of the captured SAR images to produce corresponding CCD products.

According to example embodiments of the present work, the set of complex SAR images 11 is processed to co-register the images. The process of co-registering the set of complex SAR images is also referred to herein as coarse registration. The coarse registration process produces transformations for transforming the SAR images to a predetermined image coordinate system. These transformations produced during the coarse registration are used to co-register the set of CCD products 15. In some embodiments of co-registering the SAR images, a base image is initially selected from the set of SAR images 11. Some embodiments select as the base image the image closest in time to the middle of the SAR image capture interval encompassed by the set of SAR images 11. By using this base image, error propagation may be minimized, because all images may be transformed directly into the coordinate system of the base image.

Each SAR image is registered to the base image in conventional fashion, using a corresponding transformation into the coordinate system of the base image. For a given image SAR i at 11, the corresponding transformation $T_i$ that transforms that image to the coordinate system of the base image is applied to the CCD product that corresponds to image SAR i, namely, CCD(i, i+1). The result is a set of co-registered CCD products.

The longer the SAR image capture interval, the more likely it is that attempts to register some of the captured SAR images to the base image will fail, due to changes in the scene being imaged. Over a relatively long image capture interval, these changes can be drastic and encompass the entire scene. For example, manmade structures may be added or removed, trees and other plants may grow, die, or be cut down, or fields can be tilled, planted, or harvested. Some embodiments use an intermediate base image when a registration failure occurs. A registration failure is declared for a SAR image if, during the conventional process of registering that image to the base image, the number of tie points detected is below a predetermined threshold. If a registration failure occurs, the last SAR image that was successfully registered to the current base image is selected as a new, intermediate base image. The image that failed to register, and subsequently processed images, are then registered to the intermediate base image. The corresponding CCD product will therefore not be transformed directly to the coordinate system of the original base image, but rather will be transformed according to a compound transformation wherein the image-to-intermediate base transformation is applied to the CCD product, followed by the intermediate base-to-original base transformation. Some embodiments determine a suitable tie point threshold for failure declarations based on empirical observations under anticipated operating conditions.

The use of an intermediate base image is readily extended to one or more additional intermediate base images. That is, if a registration failure occurs relative to the aforementioned intermediate base, some embodiments select a further intermediate base in the same manner as the previous intermediate base was selected. This further to intermediate base is registered to the previous intermediate base, which is in turn registered to the original base. One or more still further intermediate base images may be selected as necessary. The use of one or more intermediate base images to register a given image SAR i to the coordinate system of the original base image means that the corresponding CCD product, CCD(i, i+1), will have associated therewith a set of transformations, also referred to herein as a compound transformation. This compound transformation is applied to the CCD product, thereby co-registering that CCD product to the original base image. For example, if two intermediate bases are required to register an image SAR i to the original base image, this results in a compound transformation that includes the following three transformations: (1) a transformation of SAR i to the coordinate system of the second intermediate base image; (2) a transformation of the second intermediate base image to the coordinate system of the first intermediate base image; and (3) a transformation of the first intermediate base image to the coordinate system of the original base image.

Some embodiments are capable of producing a set of co-registered CCD products corresponding to a sequence of 350 SAR images captured over a six-month image capture interval. A limiting factor is the amount of major permanent changes (e.g., demolition of a building) that occur in the scene. As described above, the use of intermediate bases helps ameliorate these types of limitations.

Figure 2:
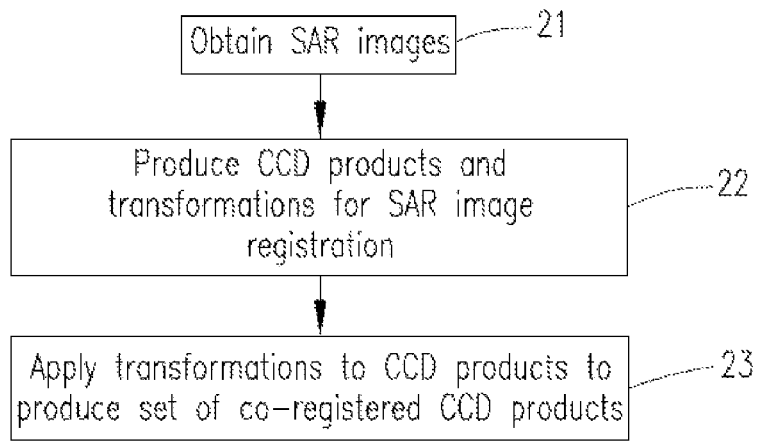
FIGS. 2-4 illustrate operations used to produce a set of co-registered CCD products according to example embodiments of the present work.

FIG. 2 illustrates operations performed according to example embodiments of the present work. The SAR images (see also 11 in FIG. 1) are obtained at 21. At 22, CCD products are produced from the SAR images (see also 13 in FIG. 1). Also at 22, transformations for transforming the SAR images to the coordinate system of an original base image are produced. At 23, each CCD product, CCD(i, i+1), has applied thereto the transformation (direct or compound) that transforms the associated image, SAR i, to the coordinate system of the original base image, thereby producing the desired set of co-registered CCD products.

Figure 3:
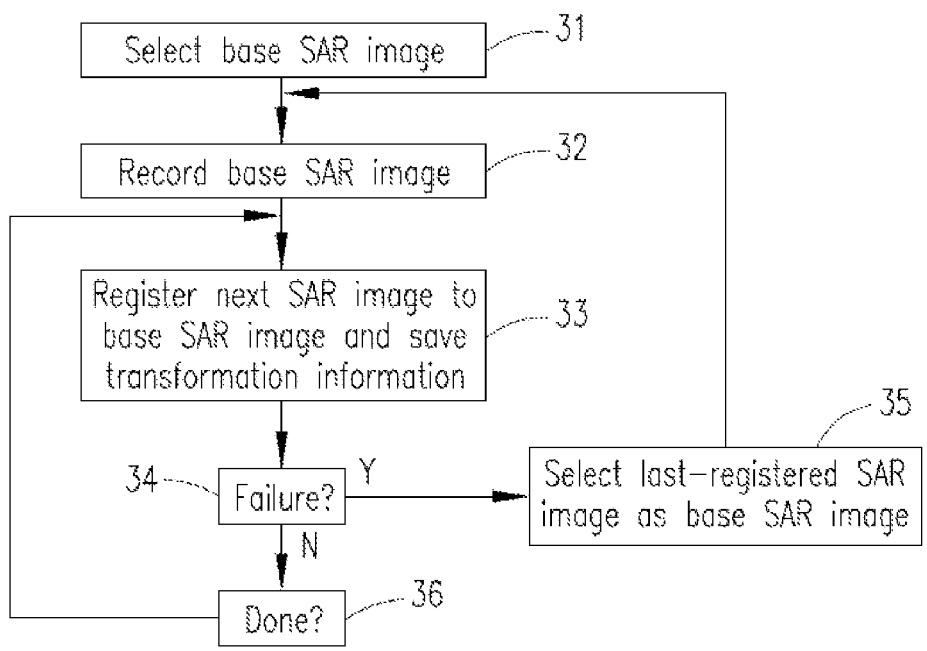

FIG. 3 illustrates operations used to produce transformations (see also 22 in FIG. 2) according to example embodiments of the present work. At 31, an original base SAR image is selected. At 32, the identity of the selected base SAR image is recorded. At 33, the next SAR image is registered to the base SAR image, and information indicative of the transformation used to accomplish the registration is saved. If it is determined at 34 that the registration at 33 was successful, then registration of the next SAR image commences at 33, unless it is determined at 36 that all SAR images are registered, in which case operation is completed. If it is determined at 34 that the registration at 33 has failed (for example, because the number of tie points detected is below a threshold), then the last successfully-registered SAR image is selected at 35 as an intermediate base image. The identity of this intermediate base image is then recorded at 32, and the registration process continues at 33.

Figure 4:
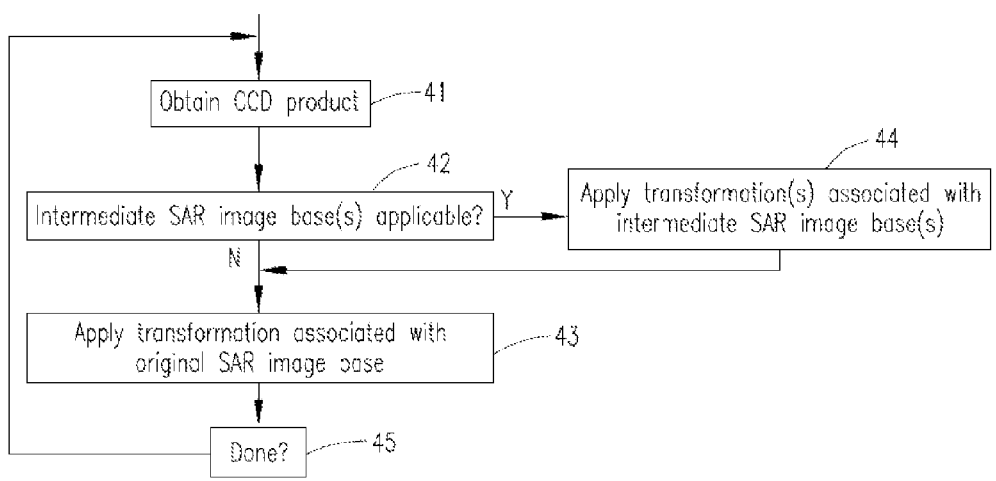

FIG. 4 illustrates operations for transforming a set of CCD products to produce a set of co-registered CCD products (see also 23 in FIG. 2) according to example embodiments of the present work. A CCD product (see also 15 in FIG. 1) is obtained at 41. It is then determined at 42 whether any intermediate base is applicable to the CCD product. If not, then a direct transformation to the original base is applied to the CCD product at 43. The next CCD product is then obtained at 41, unless it is determined at 45 that all CCD products are co-registered, in which case operation is completed. If applicability of any intermediate base(s) is determined at 42, then a compound transformation is applicable. The transformation(s) to the intermediate base(s) is/are applied to the CCD product at 44, after which operation proceeds to 43, where transformation to the original base is applied, completing the compound transformation.

Figure 5:
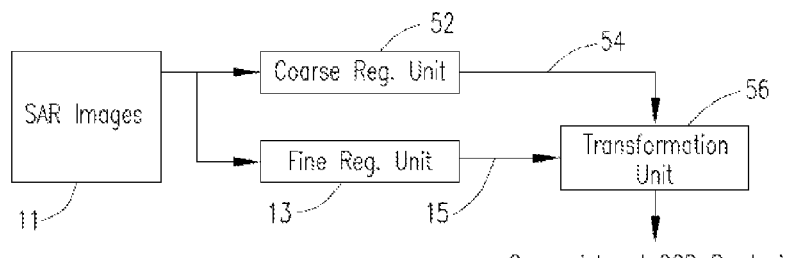
FIG. 5 diagrammatically illustrates an apparatus configured to produce a set of to co-registered CCD products according to example embodiments of the present work.

FIG. 5 diagrammatically illustrates an apparatus for producing a set of co-registered CCD products according to example embodiments of the present work. A coarse registration unit 52 is configured to produce, from the set of raw SAR images 11, information 54 indicative of the transformations required to register all of the SAR images to a base SAR image selected from the set 11. In some embodiments, the information 54 includes only direct transformations to an original base image. In some embodiments, the information 54 includes both direct transformations and compound transformations. A fine registration unit 13 is configured to produce a set of CCD products 15 from the set of SAR images 11. As mentioned above relative to FIG. 1, such production of CCD products is known in the art. A transformation unit 56 is configured to produce a set of co-registered CCD products by suitably applying to the CCD products 15 the transformations indicated by information 54.

Although example embodiments of the present work are described above in detail, this does not limit the scope of the present work, which can be practiced in a variety of embodiments.

What is claimed is:

1. A method of producing a set of co-registered coherent change detection (CCD) products using an apparatus configured to perform the method, the method comprising:

providing a set of temporally separated synthetic aperture radar (SAR) images of a target scene;

determining a plurality of transformations for respectively transforming a plurality of said SAR images to a predetermined image coordinate system using the apparatus; and using said transformations to create, from a set of CCD products produced from said set of SAR images, a corresponding set of co-registered CCD products using the apparatus, wherein said using includes applying said plurality of transformations respectively to a plurality of said CCD products, wherein one of said transformations is for transforming the associated SAR image directly to said predetermined image coordinate system, and wherein another of said transformations is a compound transformation for transforming the associated SAR image to a further image coordinate system of a further said SAR image, and further for transforming said further SAR image to said predetermined image coordinate system.

2. The method of claim 1, wherein said compound transformation is for transforming the associated SAR image to a still further image coordinate system of a still further said SAR image, and further for transforming said still further SAR image to said further image coordinate system.

3. An apparatus for producing a set of co-registered CCD products, the apparatus comprising:
   an input for receiving a set of temporally separated SAR images of a target scene;
   a SAR image registration unit coupled to said input and configured to determine a plurality of transformations for respectively transforming a plurality of said SAR images to a predetermined image coordinate system; and
   a transformation unit coupled to said SAR image registration unit and configured to use said transformations to create, from a set of CCD products produced from said set of SAR images, a corresponding set of co-registered CCD products, wherein said transformation unit is configured to apply said plurality of transformations respectively to a plurality of said CCD products, wherein one of said transformations is for transforming the associated SAR image directly to said predetermined image coordinate system, and wherein another of said transformations is a compound transformation for transforming the associated SAR image to a further image coordinate system of a further said SAR image, and further for transforming said further SAR image to said predetermined image coordinate system.

4. The apparatus of claim 3, wherein said compound transformation is for transforming the associated SAR image to a still further image coordinate system of a still further said SAR image, and further for transforming said still further SAR image to said further image coordinate system.

5. A method of producing a set of co-registered coherent change detection (CCD) products using an apparatus configured to perform the method, the method comprising:
   providing a set of temporally separated synthetic aperture radar (SAR) images of a target scene;
   determining a plurality of transformations for respectively transforming a plurality of said SAR images to a predetermined image coordinate system using the apparatus, wherein said predetermined image coordinate system is an image coordinate system of a selected said SAR image, wherein said determining includes registering said plurality of SAR images to said selected SAR image, and wherein said selected SAR image is closest among said set of SAR images to a midpoint of a time interval in which said set of SAR images was captured; and
   using said transformations to create, from a set of CCD products produced from said set of SAR images, a corresponding set of co-registered CCD products using the apparatus.

6. The method of claim 5, wherein said time interval is six months, and said set of SAR images consists of 350 SAR images.

7. The method of claim 5, wherein said using includes applying said plurality of transformations respectively to a plurality of said CCD products.

8. A method of producing a set of co-registered coherent change detection (CCD) products using an apparatus configured to perform the method, the method comprising:
   providing a set of temporally separated synthetic aperture radar (SAR) images of a target scene;
   determining a plurality of transformations for respectively transforming a plurality of said SAR images to a predetermined image coordinate system using the apparatus, wherein said predetermined image coordinate system is an image coordinate system of a selected said SAR image, and wherein said determining includes registering said plurality of SAR images to said selected SAR image; and
   using said transformations to create, from a set of CCD products produced from said set of SAR images, a corresponding set of co-registered CCD products using the apparatus, wherein said using includes applying said plurality of transformations respectively to a plurality of said CCD products, wherein one of said transformations is for transforming the associated SAR image directly to said image coordinate system of said selected SAR image, and wherein another of said transformations is a compound transformation for transforming the associated SAR image to a further image coordinate system of a further said SAR image, and further for transforming said further SAR image to said image coordinate system of said selected SAR image.

9. An apparatus for producing a set of co-registered CCD products, the apparatus comprising:
   an input for receiving a set of temporally separated SAR images of a target scene;
   a SAR image registration unit coupled to said input and configured to determine a plurality of transformations for respectively transforming a plurality of said SAR images to a predetermined image coordinate system, wherein said predetermined image coordinate system is an image coordinate system of a selected said SAR image, wherein said SAR image registration unit is configured to determine said transformations by registering said plurality of SAR images to said selected SAR image, and wherein said selected SAR image is closest among said set of SAR images to a midpoint of a time interval in which said set of SAR images was captured; and
   a transformation unit coupled to said SAR image registration unit and configured to use said transformations to create, from a set of CCD products produced from said set of SAR images, a corresponding set of co-registered CCD products.

10. The apparatus of claim 9, wherein said time interval is six months, and said set of SAR images consists of 350 SAR images.

11. The apparatus of claim 9, wherein said transformation unit is configured to apply said plurality of transformations respectively to a plurality of said CCD products.

12. An apparatus for producing a set of co-registered CCD products, the apparatus comprising:
   an input for receiving a set of temporally separated SAR images of a target scene;
   a SAR image registration unit coupled to said input and configured to determine a plurality of transformations for respectively transforming a plurality of said SAR images to a predetermined image coordinate system, wherein said predetermined image coordinate system is an image coordinate system of a selected said SAR image, and wherein said SAR image registration unit is configured to determine said transformations by registering said plurality of SAR images to said selected SAR image; and
   a transformation unit coupled to said SAR image registration unit and configured to use said transformations to create, from a set of CCD products produced from said set of SAR images, a corresponding set of co-registered CCD products, wherein said transformation unit is configured to apply said plurality of transformations respectively to a plurality of said CCD products, wherein one of said transformations is for transforming the associated SAR image directly to said image coordinate system of said selected SAR image, and wherein another of said transformations is a compound transformation for transforming the associated SAR image to a further image coordinate system of a further said SAR image, and further for transforming said further SAR image to said image coordinate system of said selected SAR image.

\* \* \* \* \*